United States Patent
Tucker et al.

(10) Patent No.: US 9,506,529 B2
(45) Date of Patent: Nov. 29, 2016

(54) HELICAL SLOTTED CABLE RETAINER FOR LIFTING ASSEMBLY AND METHOD OF ASSEMBLING

(71) Applicant: Goodrich Corporation, Charlotte, NC (US)

(72) Inventors: Peter J. Tucker, Chino, CA (US); Michael R. Barone, Amston, CT (US); Zachary Limas, Diamond Bar, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 14/614,583

(22) Filed: Feb. 5, 2015

(65) Prior Publication Data
US 2016/0230839 A1    Aug. 11, 2016

(51) Int. Cl.
*H02G 1/08* (2006.01)
*F16G 11/10* (2006.01)

(52) U.S. Cl.
CPC .................... *F16G 11/108* (2013.01)

(58) Field of Classification Search
CPC ............ H02G 1/02; H02G 1/06; H02G 1/08; H02G 1/081; H02G 1/083; H02G 1/086; H02G 1/085; H02G 1/088
See application file for complete search history.

(56) References Cited

U.S. PATENT DOCUMENTS

| | | | |
|---|---|---|---|
| 3,332,117 A | 7/1967 | McCarthy | |
| 8,667,659 B2 * | 3/2014 | Blacklin | A61B 10/02 254/134.3 FT |
| 8,839,591 B2 * | 9/2014 | Guthrie | E04G 21/3276 248/231.9 |
| 2011/0240403 A1 | 10/2011 | Millet | |
| 2012/0080650 A1 * | 4/2012 | Davidson | H02G 1/081 254/134.3 FT |
| 2013/0221298 A1 * | 8/2013 | Bennett | H02G 1/081 254/134.3 FT |
| 2014/0135181 A1 | 5/2014 | Smith | |
| 2014/0270924 A1 | 9/2014 | Savarino | |

FOREIGN PATENT DOCUMENTS

EP    2525117 A2    11/2012
GB    1149757 A    4/1969

OTHER PUBLICATIONS

Extended European Search Report for related European application No. 16154224.6, dated: Jul. 7, 2016, pp. 8.

* cited by examiner

*Primary Examiner* — Lee D Wilson
(74) *Attorney, Agent, or Firm* — Cantor Colburn LLP

(57) ABSTRACT

The lifting assembly includes a cable end housing defining an inner cavity. The lifting assembly also includes a retainer ring disposed in the inner cavity at an end thereof. The lifting assembly further includes a cable retainer disposed in the inner cavity of the cable end housing and operative to retain a cable end fitting of a cable, the cable retainer extending from a first end to a second end and defining a helical slot extending from the first end to the second end to provide installation and removal access of the cable end fitting.

9 Claims, 4 Drawing Sheets

HELICAL SLOTTED CABLE RETAINER FOR LIFTING ASSEMBLY AND METHOD OF ASSEMBLING

BACKGROUND OF THE INVENTION

The embodiments herein relate to lifting assemblies and, more particularly, to a helical slotted cable retainer for such lifting assemblies, as well as a method of assembling a lifting assembly.

Many lifting devices require attachment of a wire rope, such as a cable. This may be done by inserting a cable end fitting into a cable retainer, with the components being relatively dimensioned to prevent inadvertent removal of the cable end fitting during regular use. The loading on the lifting device is such that off-center forces may exist, thus requiring the cable end fitting to be a ball type fitting (i.e., spherical). The cable is required to be replaced on a regular basis, so attachment of the cable to the lifting device needs to support easy removal and replacement. The cable is relatively long (e.g., greater than 200 feet), so it is not practical to thread the entire length of the cable through the lifting device in order to achieve attachment.

The cable needs to remain securely attached to the lifting device whether there are tension forces or forces in the opposite direction (i.e., compression). Typically, attachment of the cable is achieved through a retainer ring and a pair of split retainers all located in a cylindrical cavity. The split retainers are assembled to the cable end fitting and the retainer ring is positioned on the split retainers. This assembly is then inserted into the cavity of a housing. However, it can be appreciated that a human installation operator may find difficulty with assembly of the several components described above, particularly due to the split retainer arrangement that must sandwich the cable end fitting.

Providing tension on the cable is present, the split retainers are pulled against the retainer ring and thus remain attached to the cable end fitting. A retaining device is added to prevent detachment of the cable from the lifting device during compressive forces of the cable since such forces may separate the split retainers that otherwise retain the cable end fitting. Unfortunately, the retaining device is prone to incorrect installation due to the cumbersome assembly effort described above.

BRIEF DESCRIPTION OF THE INVENTION

According to one embodiment, a lifting assembly is provided. The lifting assembly includes a cable end housing defining an inner cavity. The lifting assembly also includes a retainer ring disposed in the inner cavity at an end thereof. The lifting assembly further includes a cable retainer disposed in the inner cavity of the cable end housing and operative to retain a cable end fitting of a cable, the cable retainer extending from a first end to a second end and defining a helical slot extending from the first end to the second end to provide installation and removal access of the cable end fitting.

According to another embodiment, a method of assembling a lifting assembly is provided. The method includes disposing a retainer ring within an inner cavity defined by a cable end housing. The method also includes bending a cable to align the cable with a helical slot defined by a cable retainer. The method further includes inserting the cable through the slot into the cable retainer. The method yet further includes pulling the cable to engage a cable end fitting of the cable into contact with an inner surface of the cable retainer. The method also includes placing the cable retainer and the cable end fitting within the inner cavity of the cable end housing and into contact with the retainer ring.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
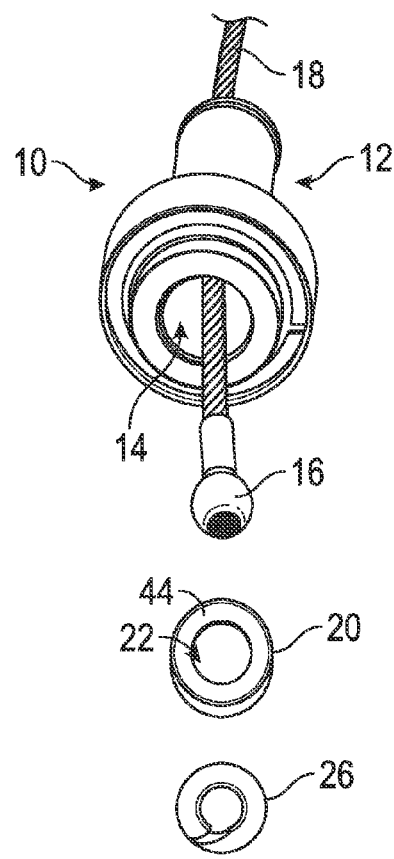
FIG. 1 is a disassembled view of a portion of a lifting assembly.

Referring to FIG. 1, a portion of a lifting assembly is illustrated and generally referenced with numeral 10. Several types of lifting assemblies, systems or devices may benefit from the embodiments described herein. For example, a crane, hoist or winch, are exemplary embodiments of lifting assemblies that would particularly benefit from the embodiments of the invention described herein. However, the preceding list of examples is merely illustrative and it is to be understood that alternative lifting assemblies may incorporate the embodiments of the invention described herein.

Figure 5:
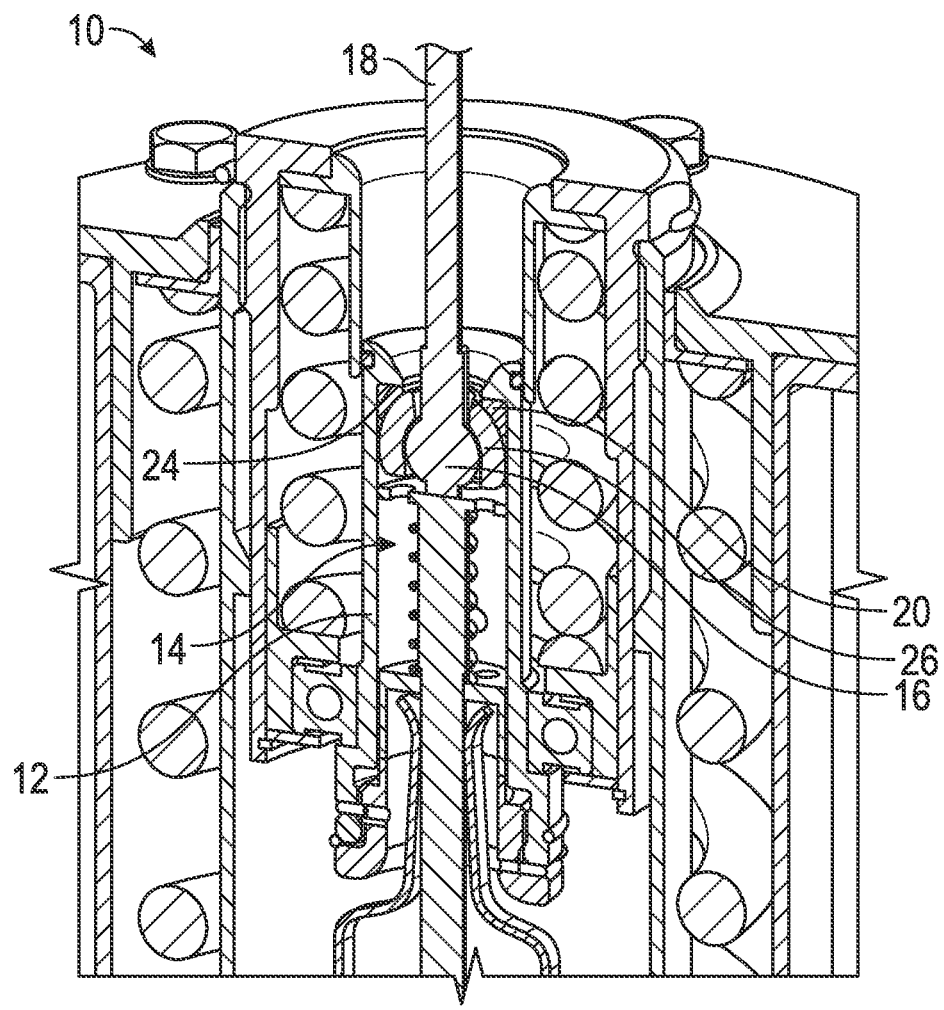
FIG. 5 is a cross-sectional view of the lifting assembly in the assembled condition.

In the illustrated disassembled view of the portion of the lifting assembly 10, several elements of the overall assembly are shown. The lifting assembly 10 comprises a cable end housing 12 that defines an inner cavity 14 for housing components for retaining a cable end fitting 16, as will be appreciated from the description herein. The cable end housing 12 may be formed of several components that are operatively coupled to each other to form the overall housing (FIG. 5). Additionally, certain components of the cable end housing 12 may be biased in desired manners with various biasing members, such as the springs illustrated in FIG. 5. The inner cavity 14 defined by the cable end housing 12 at an interior region thereof. Although several alternative geometries of the inner cavity 14 are contemplated, an exemplary embodiment of the inner cavity 14 comprises a substantially cylindrical geometry.

With continued reference to FIG. 1, a cable 18 is shown to be disposed within the inner cavity 14 of the cable end housing 12. In a final assembled condition, the cable end fitting 16 is disposed and retained within the cable end housing 12 to secure the cable to the portion of the lifting assembly 10. The cable end fitting 16 is typically formed of a substantially spherical geometry. Therefore, the cable end fitting 16 may be referred to as a ball type fitting. This geometry accommodates off-center forces that the cable 18 may exert on the lifting assembly 10 due to varied loading angles of loads applied to the cable 18.

A retainer ring 20 defines an aperture 22 that is sized to fit over the cable end fitting 16 and is inserted into the inner cavity 14 of the cable end housing 12. The retainer ring 20 is inserted in a longitudinal direction of the cable end housing 12 to an end 24 of the inner cavity 14, as shown in FIG. 5.

Figure 2:
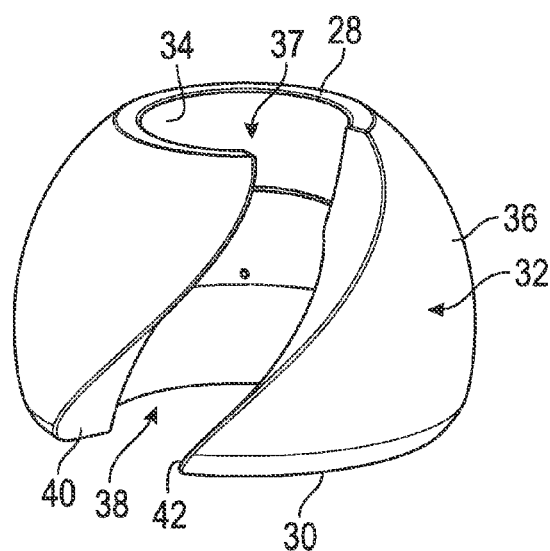
FIG. 2 is a perspective view of a cable retainer of the lifting assembly.
Figure 3:
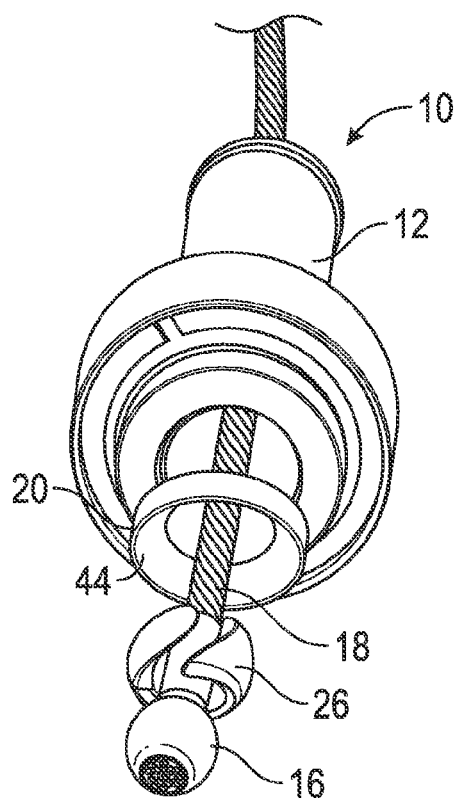
FIG. 3 is a partially assembled view of the lifting assembly.

Referring now to FIGS. 1-3, a cable retainer 26 is illustrated. The cable retainer 26 includes a first end 28 and a second end 30. A curvilinear wall 32 forms the cable retainer 26 and includes a retainer inner surface 34 and a retainer outer surface 36, with the retainer inner surface 34 defining an interior region 37 of the cable retainer 26. The cable retainer 26 also defines a slot 38 extending completely through the curvilinear wall 32 and completely from the first end 28 to the second end 30. More specifically, the slot 38 is defined by a first retainer wall 40 and a second retainer wall 42. The first and second retainer walls 40, 42 are non-linear along at least a portion of their respective lengths, thereby forming a helical slot along at least a portion of its length. In one embodiment, the first and second retainer walls 40, 42 are non-linear along an entirety of their respective lengths, thereby forming a helical slot along an entirety of the slot 38.

Figure 4:
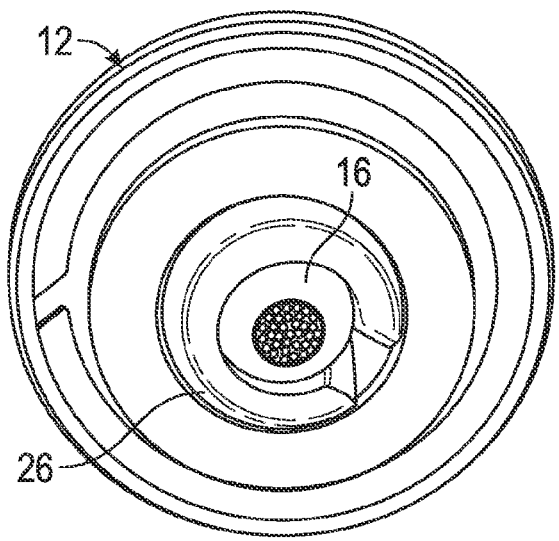
FIG. 4 is an end view of the lifting assembly in an assembled condition.

The cable retainer 26 is a single, integrally formed component in contrast to cable retainers having multi-piece designs, such as split collar designs, for example. The unitary cable retainer 26 allows an installation operator to easily grip the cable retainer 26 with one hand while inserting the cable 18 through the helical slot 38 by bending the cable to align with the helical orientation of the slot 38. The unitary cable retainer 26 may even facilitate one-handed installation of the cable 18 through the slot. Upon insertion through the slot 38, the cable retainer is inserted into the inner cavity 14 of the cable end housing 12. Insertion is made until the retainer outer surface 36 of the cable retainer 26 contacts a ring inner surface 44 of the retainer ring 20. The retainer outer surface 36 and the ring inner surface 44 have substantially corresponding geometries, such that the cable retainer 26 seats within a portion of the retainer ring 20 upon full insertion of the cable retainer 26 into the cable end housing 12. Typically, the cable retainer 26 and the retainer ring 20 are in direct contact. The cable 18 is then pulled to bring the cable end fitting 16 into contact with the retainer inner surface 34 of the cable retainer 26. Such a final assembled condition is shown in FIGS. 4 and 5.

Figure 6:
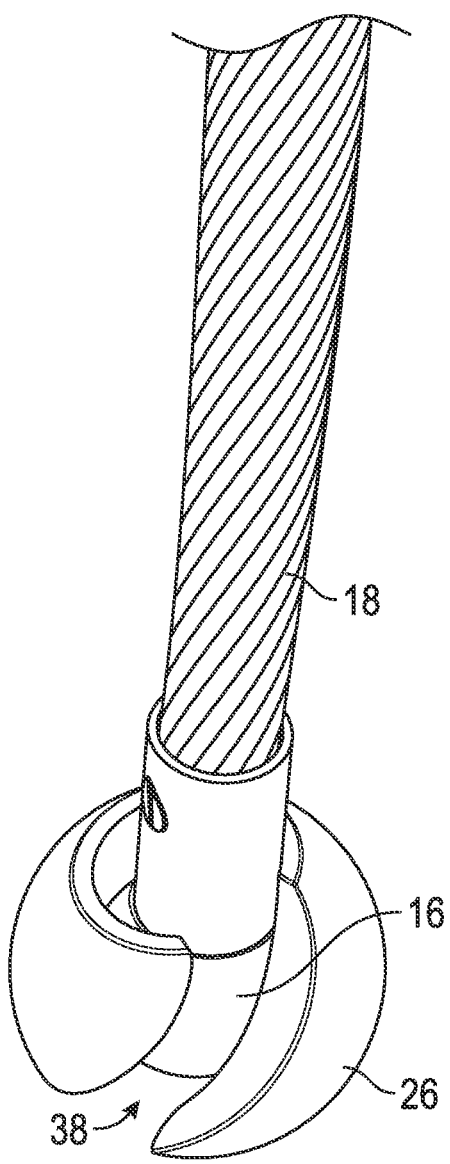
FIG. 6 is a perspective view of a cable end fitting of the lifting assembly self-retained within a cable retainer.

Advantageously, the helical slotted cable retainer 26 described herein has self-retaining capability to the cable end fitting 16, as shown in FIG. 6. Additionally, installation and removal efforts are substantially simplified in comparison to a cable retainer having multiple components, such as a split collar design. In addition to enhancing the assembly process, a more reliable assembly is achieved with the embodiments of the cable retainer 26 described herein. Specifically, the cable fitting cannot be inadvertently removed from the cable retainer 26, even during a compressive force being applied to the cable 18. This is due to the single component that forms the cable retainer 26. In contrast, a split retainer may loosen during the imposition of a compressive force on the cable 18, thereby extracting the cable 18 and potentially leading to safety hazards.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A lifting assembly comprising:
   a cable end housing defining an inner cavity;
   a retainer ring disposed in the inner cavity at an end thereof; and
   a cable retainer disposed in the inner cavity of the cable end housing and operative to retain a cable end fitting of a cable, the cable retainer extending from a first end to a second end and defining a helical slot extending from the first end to the second end to provide installation and removal access of the cable end fitting, the cable retainer comprising a retainer outer surface in direct contact with a ring inner surface of the retainer ring.

2. The lifting assembly of claim 1, wherein the cable retainer comprises a single, integrally formed component.

3. The lifting assembly of claim 1, wherein the cable end fitting comprises a spherical geometry.

4. The lifting assembly of claim 3, wherein the cable retainer comprises a retainer inner surface having a geometry corresponding to a portion of the spherical geometry of the cable end fitting.

5. The lifting assembly of claim 1, wherein the ring inner surface comprises a geometry corresponding to a portion of the geometry of the retainer outer surface.

6. The lifting assembly of claim 1, wherein the helical slot is defined by a first retainer wall and a second retainer wall, wherein the first and second retainer walls are each non-linear along an entirety thereof.

7. The lifting assembly of claim 1, wherein the lifting assembly is part of a hoist.

8. The lifting assembly of claim 1, wherein the lifting assembly is part of a crane.

9. The lifting assembly of claim 1, wherein the lifting assembly is part of a winch.

* * * * *